United States Patent
Reichardt et al.

(10) Patent No.: US 10,438,423 B2
(45) Date of Patent: Oct. 8, 2019

(54) ELECTRONIC UNIT FOR A VEHICLE COMMUNICATION INTERFACE FOR BIDIRECTIONAL COMMUNICATION

(71) Applicant: Robert Bosch GmbH, Stuttgart (DE)

(72) Inventors: Herbert Reichardt, Aichwald (DE); Christian Gern, Wernau (DE); Fabian Hokenmaier, Waeschenbeuren (DE); Stefan Doehren, Remshalden-Grunbach (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 15/123,548

(22) PCT Filed: Jan. 26, 2015

(86) PCT No.: PCT/EP2015/051485
§ 371 (c)(1),
(2) Date: Sep. 2, 2016

(87) PCT Pub. No.: WO2015/132017
PCT Pub. Date: Sep. 11, 2015

(65) Prior Publication Data
US 2017/0084088 A1    Mar. 23, 2017

(30) Foreign Application Priority Data
Mar. 6, 2014    (DE) .................. 10 2014 204 128

(51) Int. Cl.
*G06F 13/40*    (2006.01)
*G07C 5/00*    (2006.01)
(Continued)

(52) U.S. Cl.
CPC ............. *G07C 5/008* (2013.01); *G05B 15/02* (2013.01); *H04L 12/40* (2013.01); *H04L 67/12* (2013.01);
(Continued)

(58) Field of Classification Search
CPC ........ G06F 13/40; H04L 49/101; G07C 5/008
See application file for complete search history.

(56) References Cited

U.S. PATENT DOCUMENTS

2006/0217855 A1    9/2006    Chinnadurai et al.
2008/0000476 A1    1/2008    Seashore et al.
(Continued)

FOREIGN PATENT DOCUMENTS

CN    1617120 A    5/2005
CN    1722030 A    1/2006
(Continued)

OTHER PUBLICATIONS

International Search Report dated May 7, 2015, of the corresponding International Application PCT/EP2015/051485, filed on Jan. 26, 2015.

*Primary Examiner* — David E Martinez
(74) *Attorney, Agent, or Firm* — Norton Rose Fulbright US LLP; Gerard Messina (57) ABSTRACT

An electronic unit for a vehicle communication interface, and a vehicle communication interface of that kind, are described. The electronic unit includes a switch matrix having at least one low-leakage-current switch that is designed to interrupt both communication devices simultaneously.

22 Claims, 7 Drawing Sheets (51) Int. Cl.
  *H04L 12/933* (2013.01)
  *G05B 15/02* (2006.01)
  *H04L 12/40* (2006.01)
  *H04L 29/08* (2006.01)

(52) U.S. Cl.
  CPC .................... *G07C 2205/02* (2013.01); *H04L 2012/40215* (2013.01)

(56) References Cited

U.S. PATENT DOCUMENTS

| | | | |
|---|---|---|---|
| 2008/0103652 A1 | 1/2008 | McGee et al. | |
| 2013/0107408 A1* | 5/2013 | Le Brun | H02H 3/207 361/90 |
| 2013/0107409 A1* | 5/2013 | McGee | H02H 9/041 361/91.1 |
| 2017/0084088 A1* | 3/2017 | Reichardt | G07C 5/008 |

FOREIGN PATENT DOCUMENTS

| | | |
|---|---|---|
| CN | 102591326 A | 7/2012 |
| EP | 2259230 A1 | 12/2010 |
| EP | 2302597 A1 | 3/2011 |

\* cited by examiner

ELECTRONIC UNIT FOR A VEHICLE COMMUNICATION INTERFACE FOR BIDIRECTIONAL COMMUNICATION

FIELD

The present invention relates to an electronic unit for a vehicle communication interface, and to such a vehicle communication interface.

BACKGROUND INFORMATION

A vehicle communication interface, also referred to as a VCI, is used in the context of vehicle diagnosis. It is to be understood as a number of technical methods and applications that are utilized, for example, in fault analysis in the context of defects, in quality assurance, and in vehicle development. Vehicle diagnostic interfaces that are designed especially for vehicle diagnosis are used for data interchange with the vehicle or with components in the vehicle. These vehicle diagnostic interfaces can be constituted in various ways. A uniform communication interface, with which control can be applied to the different vehicle diagnostic interfaces, is therefore necessary.

Vehicle communication interfaces, referred to as VCIs, have been used for this for several years; they are utilized as an interface between at least one vehicle diagnostic interface and a computation unit, for example a personal computer (PC). The vehicle diagnostic interface in the vehicle is in turn connected to the control devices installed in the vehicle. A variety of interfaces are used in this context, for example high speed CAN, fault-tolerant CAN, single wire CAN, J1850, or OEM-specific interfaces. The Controller Area Network (CAN) is a serial bus system. "OEM" refers to an "original equipment manufacturer." The terminal assignment or pin assignment of the vehicle diagnostic interface is defined in this context.

The pin assignment at the on-board diagnostic (OBD) plug is thereby also defined. The interface definition nevertheless leaves open options which result in OEM-specific assignments. It should furthermore be noted that older vehicles may not have an OBD plug, but may possess customer-specific diagnostic plug connectors.

The VCI contains a variety of transceivers and controllers in order to support the protocols recited above. The various pins of the transceivers can furthermore be switched via a so-called switch matrix to many pins of the OBD plug. The VCI can also be connected via specific adapter cables to other OEM-specific diagnostic interfaces.

Conventional VCIs may possess an analog to digital converter (ADC) which, inter alia, enables instrumental evaluation of transceiver signals. Additional diagnostic functions can be implemented therewith, for example a level check of signals for the correct High and Low levels. In positive logic, a High level is a logical 1, a Low level is a logical 0. This makes possible farther-reaching or deeper diagnosis than with simple digital evaluation of the transceiver signals. Early detection of high-impedance terminating resistors or leads, prior to total failure, thereby also becomes possible.

U.S. Patent Application Publication No. 2008/0004762 A1 describes an application-specific integrated circuit that is equipped with a vehicle diagnostic tool. The circuit encompasses a power supply module, a keypad interface, an oscillator, a microcontroller, a data connection controller, a vehicle interface, a display controller, and a memory interface.

China Patent No. CN 102591326 A describes an interface module for vehicle diagnosis. This module encompasses a switch matrix, a bus transceiver module, a selection module for serial data input channels, and an internal power supply circuit module.

The interface between the PC and the VCI can be embodied in wire-based fashion, for example with a Universal Serial Bus (USB) interface, a serial interface, or wirelessly, e.g. Bluetooth (BT), wireless local area network (WLAN), ZigBee, an industry standard for radio networks, or using other radio standards. The application software installed on the connected PC can configure the VCI, and via the VCI it retrieves, for example, diagnostic information from the control devices in the vehicle.

Present-day VCIs possess a discretely constructed switch matrix and transceivers implemented in part discretely. VCIs possess, in principle, further depicted functional groups.

SUMMARY

In light of the above, an electronic unit and a vehicle communication interface (VCI) are provided.

The electronic unit in accordance with the present invention services a vehicle communication interface that is designed for bidirectional communication. The electronic unit encompasses a switch matrix having at least one switch that is connected to a first pin and to a second pin, in a first communication direction the first pin transmitting and the second pin receiving, and in a second communication direction the first pin receiving and the second pin transmitting, the at least one switch being designed to interrupt or shut off both communication directions simultaneously. The electronic unit is embodied as an integrated module. At least one of the at least one switch can be embodied as a low-leakage-current switch. In an embodiment, multiple switches that are all embodied as low-leakage-current switches are provided. The electronic unit can furthermore encompass an element for switching the at least one switch.

If only one switch is provided, the switch matrix is then embodied as a 1×1 matrix. If, for example, four switches are provided, the switch matrix is then embodied as a 2×2 or also a 4×1 switch matrix. Different numbers of switches, and various switch matrices, are possible.

In an embodiment, the electronic unit is embodied as an application-specific integrated circuit or ASIC. The use of an ASIC allows the structure of the electronic unit to be directed toward the application.

Figure 4:
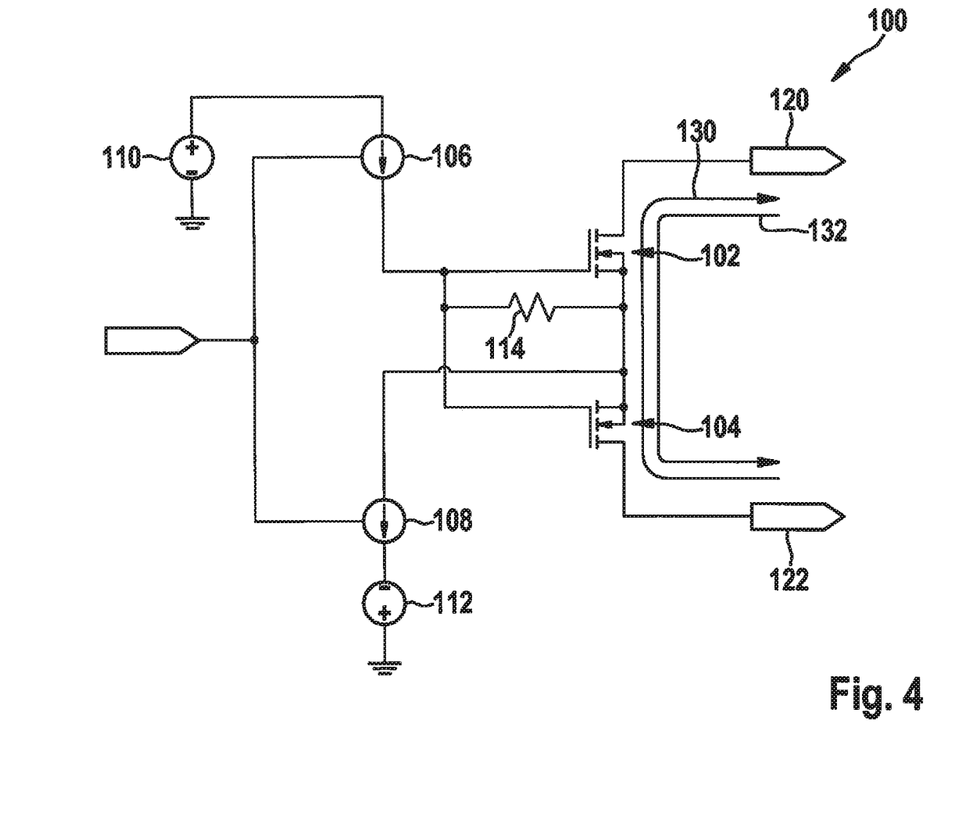
FIG. 4 shows a back-to-back switch structure.

At least one of the at least one switch of the switch matrix is embodied, for example, as a back-to-back switch structure. If multiple switches are provided, then at least one of the switches can be embodied as a back-to-back switch structure. In an embodiment, all the switches are embodied with a back-to-back switch structure. Reference is made in this regard to FIG. 4. It is to be considered that at least one of the at least one switch is embodied as a low-leakage-current switch. If multiple switches are provided, each switch can then be embodied as a low-leakage-current switch.

A transceiver assemblage or transceiver array that serves as a level converter can furthermore be provided.

In a further embodiment, an additional computation unit is provided which serves as master in the electronic unit. The master function indicates a hierarchical structure within the electronic unit. The master controls the other components, which are also referred to as "slaves." A programmable integrated circuit or a field programmable gate array (FPGA) can also be used instead of the computation unit.

A further communication interface that serves, inter alia, for configuration of the electronic unit can moreover be additionally provided.

A module having an ADC can moreover be additionally provided, the ADC interacting with a multiplexer in order to allow different vehicle buses to be addressed.

A module having an ADC multiplexer can moreover be additionally provided in order to adapt the electronic unit to different vehicle buses. In the module having an ADC multiplexer, the multiplexer directs multiple signals to one ADC input.

In a further embodiment, a monitoring module that serves to control the master is additionally provided.

A voltage monitor that serves to monitor external voltages can also be additionally provided.

Also provided is a vehicle communication interface for connection to a vehicle diagnostic interface by way of which a vehicle diagnosis can be carried out. The latter encompasses an electronic unit of the kind described above.

In an embodiment, the example electronic unit for a vehicle communication interface can thus encompass the following blocks or modules:

switching matrix having switches that, in an embodiment, have very low leakage currents and are configured for high impedance, and are linked to a precise analog measurement device; switch matrix operation is designed for a wide negative and positive range of input voltages, i.e., the possibility exists of being able to switch communication signals to various data link connector (DLC) pins; the result is that different manufacturer-specific communication types are supported;

transceiver assemblage, which serves as an interface that converts controller signals into protocol-specific signals and thus represents a level converter;

communication interface having a control and status register; this serves to configure the electronic unit, for example an ASIC, and for diagnosis, in particular fault diagnosis, and for fault handling;

ADC having a multiplexer; the ADC is used to carry out diagnoses on a variety of vehicle buses; each pin can be serviced therewith;

analog multiplexer; this is disposed before the ADC so that the ADC can switch to every DLC pin via the multiplexer in order to divide a signal, vary the voltage input range or measurement range; the ADC multiplexer can be deactivated in order to enable highly accurate voltage measurements;

autonomous control unit having state machines for ADC measured data processing in order to switch off or relieve load on an external star distributor or multipoint control unit (MCU); this is designed to sense voltage signals on DLC pins cyclically, time-synchronously, or even angle-synchronously; this control unit furthermore automatically carries out a sampling of the ADC measured values; no additional outlay relating to the use of software is needed in order to trigger this;

DLC communication buffer; this serves to buffer data, in particular ADC data or communication data;

voltage monitor for external voltages; this is used to reset the ASIC to the baseline or default state in the event of a voltage undershoot, the switches on the SPI register being reset;

reset processing system having a so-called reset module with which a system voltage of the VCI is monitored; in the event of undershoot a RESET is generated; this can be directed to an FPGA that in turn resets the VCI; monitoring unit; by way of a cyclic query-response interaction this allows verification of the functionality of the master, of a computer, or of an FPGA in the overall system; a connection exists to the reset processing system; the latter is triggered upon overshoot of a fault counter.

The example hardware represents a backward-compatible solution for already available discrete implementation of the hardware modules described above.

The example electronic unit in the VCI, which is implemented, e.g., in an ASIC, can be used in versatile fashion. In addition to analog voltage measurement, which enables extensive diagnosis of the bus system, the electronic unit or the VCI ASIC opens up the following possibilities or potentials, and encompasses the following functionalities:

1. Presents an inexpensive hardware solution for VCIs due to a reduction in circuit board area requirement.

2. The VCI ASIC supports parallel communication. This means that many different vehicle interfaces can be serviced in parallel via the OBD plug. This functionality supports faster vehicle diagnosis times and programming times.

3. A further functionality to be emphasized is integration of a measurement technology functionality in the system ASIC. With this measurement technology an analog measurement of external signals, e.g. CAN signals, can be made.

4. A further feature of the VCI ASIC is that digital sensors and actuators can be diagnosed via the measurement technology module.

5. A further feature is the available coverage of the ASIC, so that beyond the OBD-specified diagnostic possibilities, all presently known diagnostic possibilities of all vehicles of all manufacturers can be covered.

6. The previously known ASIC solutions process negative input signals only down to −2 V; the proposed VCI ASIC processes negative voltages down to full CAN conformity. "CAN conformity" here means conformity with a standard that describes two layers, namely the "physical layer" and the "protocol layer," of the OSI layer model of the network protocols being used. The Open Systems Interconnection (OSI) layer model is a reference model for network protocols constituting a layer architecture. The OSI layer model enables communication over a variety of technical systems. The model defines for this purpose seven successive layers that each have narrowly delimited tasks associated with them.

Further advantages and embodiments of the present invention are evident from the description herein and from the figures.

It is understood that the features recited above and those yet to be explained below are usable not only in the respective combination indicated but also in other combinations or in isolation, without departing from the scope of the present invention.

DETAILED DESCRIPTION OF EXAMPLE EMBODIMENTS

The present invention is schematically depicted in the figures on the basis of specific embodiments, and is described in detail below with reference to the figures.

Figure 1:
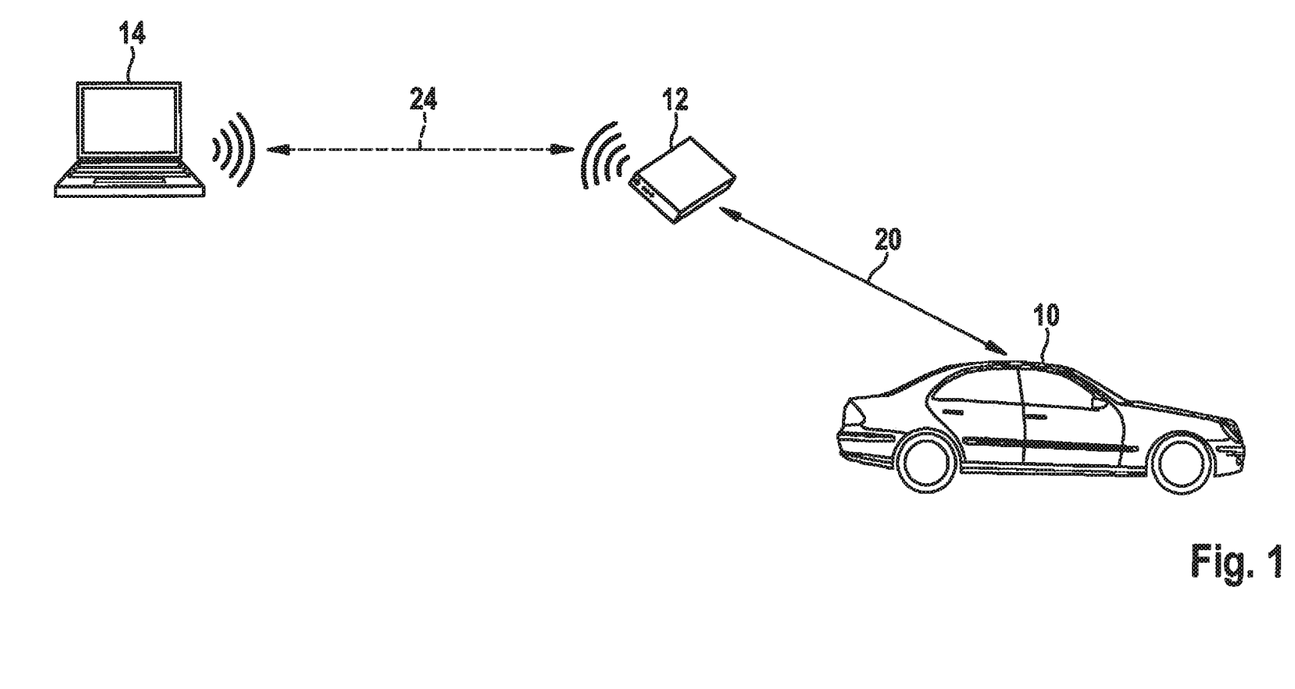
FIG. 1 is an overview depiction of a system block diagram.

FIG. 1 shows a typical system block diagram to illustrate the execution of a vehicle diagnosis. The Figure shows a vehicle 10, a vehicle communication interface 12 that is also referred to herein as a "VCI," and an external computation unit 14, typically a PC.

With VCI 12, data can be exchanged with vehicle 10 in the context of an on-board diagnosis 20, a variety of vehicle diagnostic interfaces being used. Data are read out from vehicle 10. VCI 12 conveys those data to computation unit 14, in which they are evaluated. An interface 24, for example USB or WiFi, is typically used to transfer the data between VCI 12 and computation unit 14. Computation unit 14 can also, however, be integrated into the overall system, for example as an embedded device.

Figure 2:
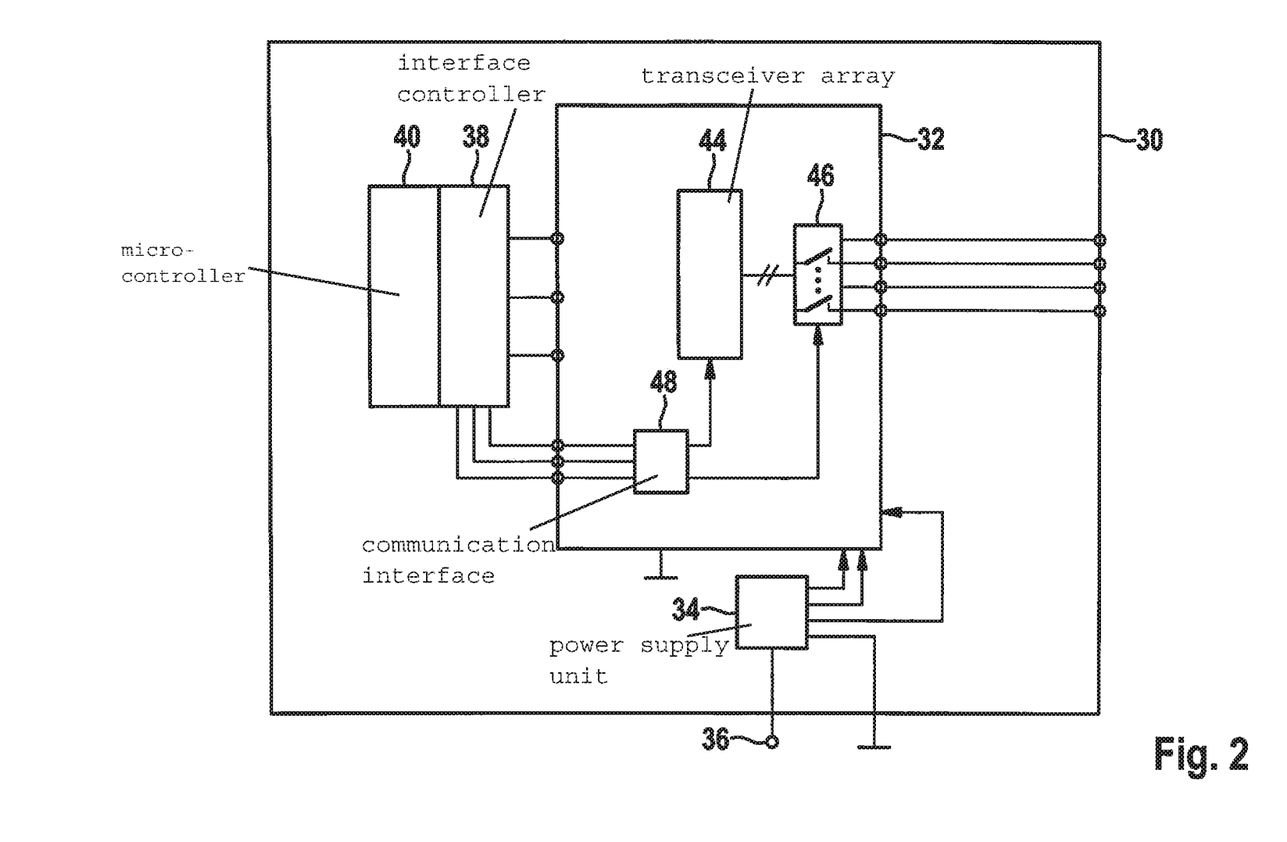
FIG. 2 shows an embodiment of the proposed vehicle communication interface.

FIG. 2 shows the configuration and function of the proposed vehicle communication interface having an integrated ASIC that serves as an electronic unit of the kind described.

Figure 7:
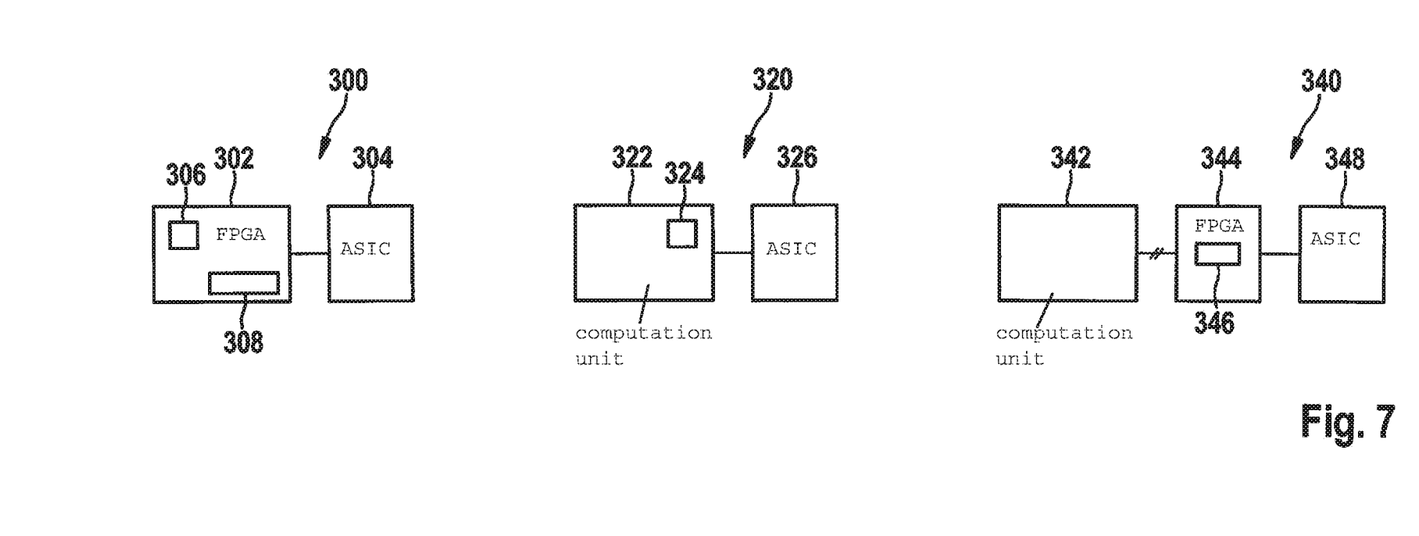
FIG. 7 shows possible configurations of the vehicle communication interface.

The Figure shows, in a highly simplified block diagram, a vehicle communication interface 30 that is hereinafter also referred to as a "VCI." An electronic unit 32, which is typically embodied as an ASIC, is provided in this vehicle communication interface 30. Also provided in vehicle communication interface 30 is a power supply unit 34 which is connected to an external battery 36 that furnishes, for example, 12-volt supply voltage, and which provides various supply voltages, for example 5 V, 10 V, and 3.3 V. Also provided are an interface controller 38 and/or a microcontroller 40, which can be implemented in an FPGA. Microcontroller 40 and interface controller 38 can also be present as so-called standalone devices. Possible configurations are shown in FIG. 7.

A transceiver array 44, a switch matrix 46, and a communication interface 48 having a control and status register are provided in the electronic unit. Transceiver array 44 and communication interface 48, or switch matrix 46 and communication interface 48, can be provided in a separate electronic unit.

Figure 3:
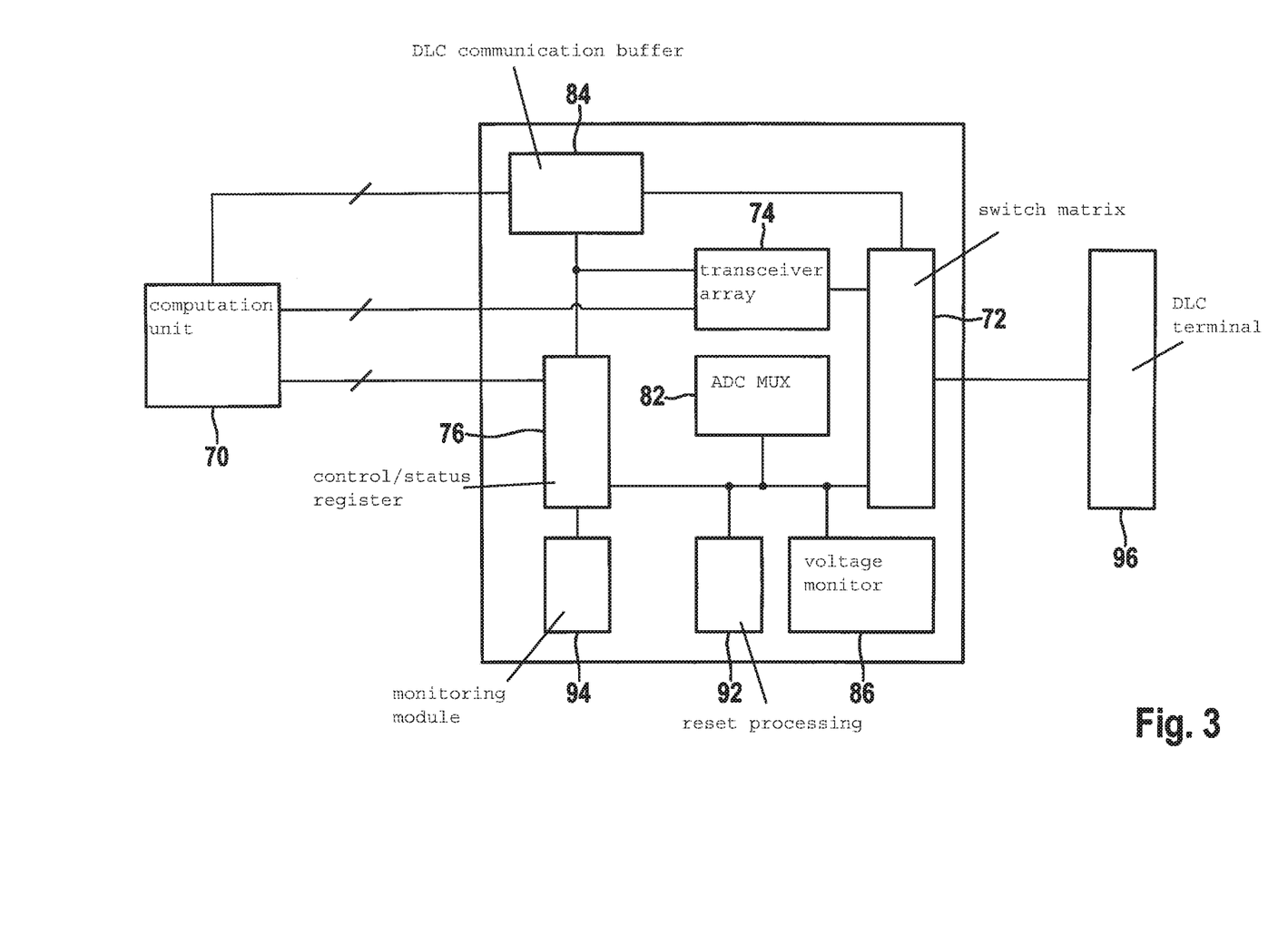
FIG. 3 shows an embodiment of a VCI ASIC that serves as an electronic unit.

Electronic unit 32 of FIG. 2, which is also referred to as a "VCI ASIC," can be of modular configuration and can possess the modules depicted in FIG. 3. FIG. 3 shows an embodiment of the electronic unit having a computation unit 70 (alternatively, an FPGA or an FPGA that is disposed between computation unit 70 and the VCI ASIC can be provided), a switch matrix 72, a transceiver array 74, a control/status register 76, an ADC having an ADC multiplexer 82, a DLC communication buffer 84, a voltage monitor 88, a block 92 for reset processing, a monitoring module 94, and a diagnostic link connector (DLC) terminal 96.

The modules will be further described below in terms of their functionality.

Switch Matrix and Transceiver Array

In an embodiment, the central elements of the VCI ASIC are the switch matrix and the transceiver array. The switch matrix supports parallel communication and is configured in such a way that the output interface to the OBD plug connector is robust with respect to voltage mispolarity and overvoltage, and in terms of high peak voltages. The switch matrix is subdivided into various switch groups that support different requirements in terms of voltage capability, input and throughput capacity, and continuity resistance. The switch matrix furthermore supports diagnosis over IP (DoIP), for example by way of an Ethernet interface in the vehicle.

In an embodiment, a feature that is important is the construction of the switches, which are configured in very special and complex fashion so that it is possible to apply the measurement technology, with and without active communication with the vehicle, at each pin, individually or in parallel. This option is not possible at present with conventionally discretely constructed switches, and requires larger special optical switches and relays associated with a greater space requirement and higher cost. The background is the low-leakage-current switches required for the measurement technology, so that voltage measurements having a large measurement error cannot occur at the ADC. The special ASIC switches are newly developed switches derived from conventional ASIC switches from the medical sector, having extremely low leakage currents and the additionally required negative voltage range for vehicle diagnosis.

Not only can a diagnosis be carried out by communication with the vehicle via the usual standard transceiver, but the communication itself can be diagnosed via measurement technology in order to detect and more accurately diagnose hardware faults within that diagnostic interface. For this, the ADC with multiplexer described herein is used in interaction with the switch matrix and with the transceiver array.

An internal programmable state machine is used to allow cyclic measurement of the voltages at DLC pins. The following fault cases can be diagnosed by way of the voltage measurement using the ADC:

short circuit to vehicle ground or to another voltage source in the wiring harness of the vehicle;
 load drop or open load in the supply lead of the VCI to the vehicle;
 open load at the external wiring harness of the vehicle;
 accurate analog measurement of the High and Low levels of signals during communication, in order to detect over- and undershoots of permissible limits.

High input resistance values of the ADC measurement circuit are necessary for open load measurements with integrated measurement technology. A leakage current of the switches in the switch matrix of, for example, 1 µA would cause a measured value distortion of 1 V across that resistance. This is not usable for open load diagnosis. A very much more accurate final measurement range value is needed.

This open load diagnosis is therefore possible only if, in addition to the high output resistance of the ASIC, the latter also exhibits very low leakage currents, namely a few nA, when the switches in the switch matrix are open or closed. The switch is made up, for example, of a back-to-back switch structure having two MOSFETs, as depicted in FIG. 4. Such switches can be shut off in both directions; a parasitic current path forms.

FIG. 4 shows a back-to-back switch structure having two MOSFETs, which is labeled in its entirety with the reference number 100. It encompasses a first MOSFET 102 and a second MOSFET 104, a first switched current source 106, a second switched current source 108, a first voltage source 110, and a second voltage source 112. Also depicted are a first pin 120 and a second pin 122. Communication can occur bidirectionally, i.e., in both directions. This means that first pin 120 can both receive and transmit and is connected, for example, to DLC pins, and second pin 122 can both transmit and receive and is typically conducted further in the ASIC. This can then be conducted to further internal switches or to a transceiver. Two communication directions are thus possible. In a first communication direction 130, first pin 120 transmits and second pin 122 receives; in a second communication direction 132, first pin 120 receives and second pin 122 transmits. Back-to-back switch structure 100 now makes it possible to enable the two communication directions 130 and 132 selectably, and also to shut off both communication directions 130 and 132 at one point in time, i.e., to suppress or deactivate the signal flow in both communication directions 130 and 132. Switch structure 100 is an example of a switch, at least one switch being provided in accordance with claim 1. If an element for switching this switch is provided, then if the switch is embodied, as in the embodiment described, as a back-to-back switch structure 100 having the two MOSFETs 102 and 104, said element can be an element, for example a logic element, that applies control in regularly separate fashion to the two MOSFETs 102 and 104, for example with a High or a Low level. The element can apply control to the MOSFETs separately from one another, i.e. can apply control to them with different signals. The two communication directions 130 and 132 can thus be selectably enabled, or also both deactivated.

The minimized leakage current is achieved by the use of special gate-source control application. This special control application is notable for the fact that control is applied using a non-ground-referred voltage source or current source. In the switched-on state this is made up, for example, of the two switched current sources 108, 110 that mutually compensate for the current through a gate-source resistor 114 so that a leakage current does not flow through back-to-back switch structure 100 having the two MOSFETs 102, 104. In the switched-off state, the back-to-back switch structure is blocked by gate-source resistor 114 at high impedance.

The communication interface having a control and status register will be discussed below:

The ASIC is configured and controlled via a communication interface. Diagnosis is also possible via the interface. Measured values from the integrated measurement technology, ADC with multiplexer, and measured data conditioner can also be obtained via the interface.

Figure 5:
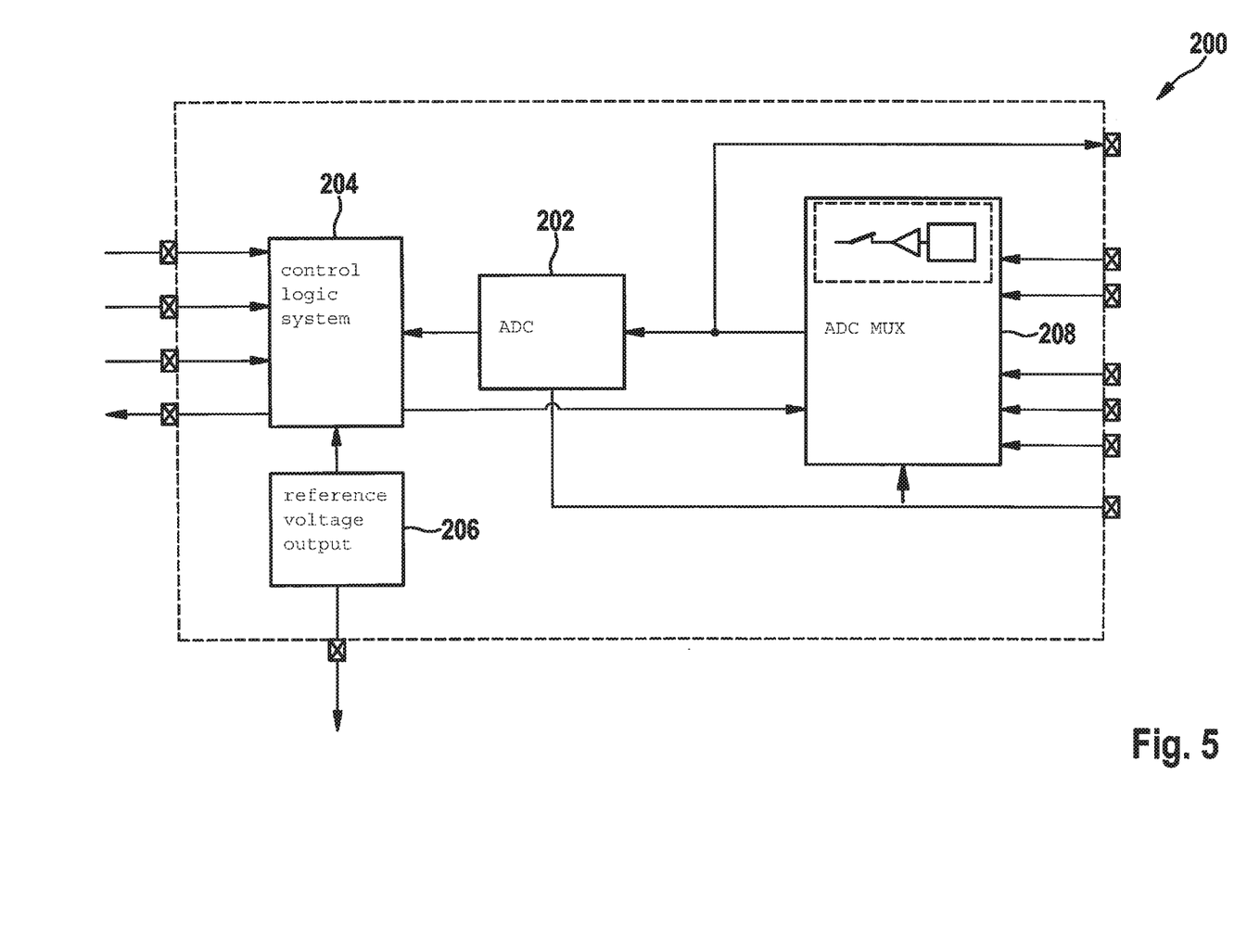
FIG. 5 is a block diagram showing an ADC and an ADC multiplexer.

FIG. 5 shows a module that has an ADC and ADC multiplexer and is labeled in its entirety with the reference number 200. The Figure shows an ADC 202, a control logic system 204, a reference voltage output 206, and an ADC multiplexer 208, which in this case encompasses thirty-two channels. ADC 202 can also be implemented externally. In that case only the multiplexer would then be implemented in the ASIC.

ADC 202 supports the measurement of transceiver voltage signals and the measurement of external voltage signals, for example from sensors and actuators.

Signals from digital sensors are furthermore intended to be capable of being analyzed and evaluated. The evaluation of digital sensor signals in the VCI ASIC thus economizes on computer resources and therefore costs. This integrated function block can represent a unique distinguishing feature. The multiplexer at present supports a plurality of analog and digital inputs.

The basic performance features of ADC 202 in this embodiment are:
at least 8-bit resolution;
ADC input voltage with a reference voltage;
minimum sampling rate of 10 ks/s.

The basic performance features of multiplexer 208 in this embodiment are:
n/1 multiplexer;
buffered voltage divider with a number of inputs, with adaptation of the voltage range and a tolerance of at least less than 1%.

The basic performance features for reference voltage output 206 in this embodiment are:
approximately 5 V;
tolerance: +/−1%;
output current: 1 mA.

Measurement technology processing unit 204 respectively stores the maximum, minimum, and average value that has occurred for each channel over a time range that has been set. The present measured value of each channel can also be read out independently thereof.

In addition to the built-in measurement technology processing unit, the ASIC offers outputs for an external measurement technology with which it is possible to diagnose communication at a higher resolution, for example using oscilloscope functions. For example, CAN curves or messages can be displayed in more detail.

Figure 6:
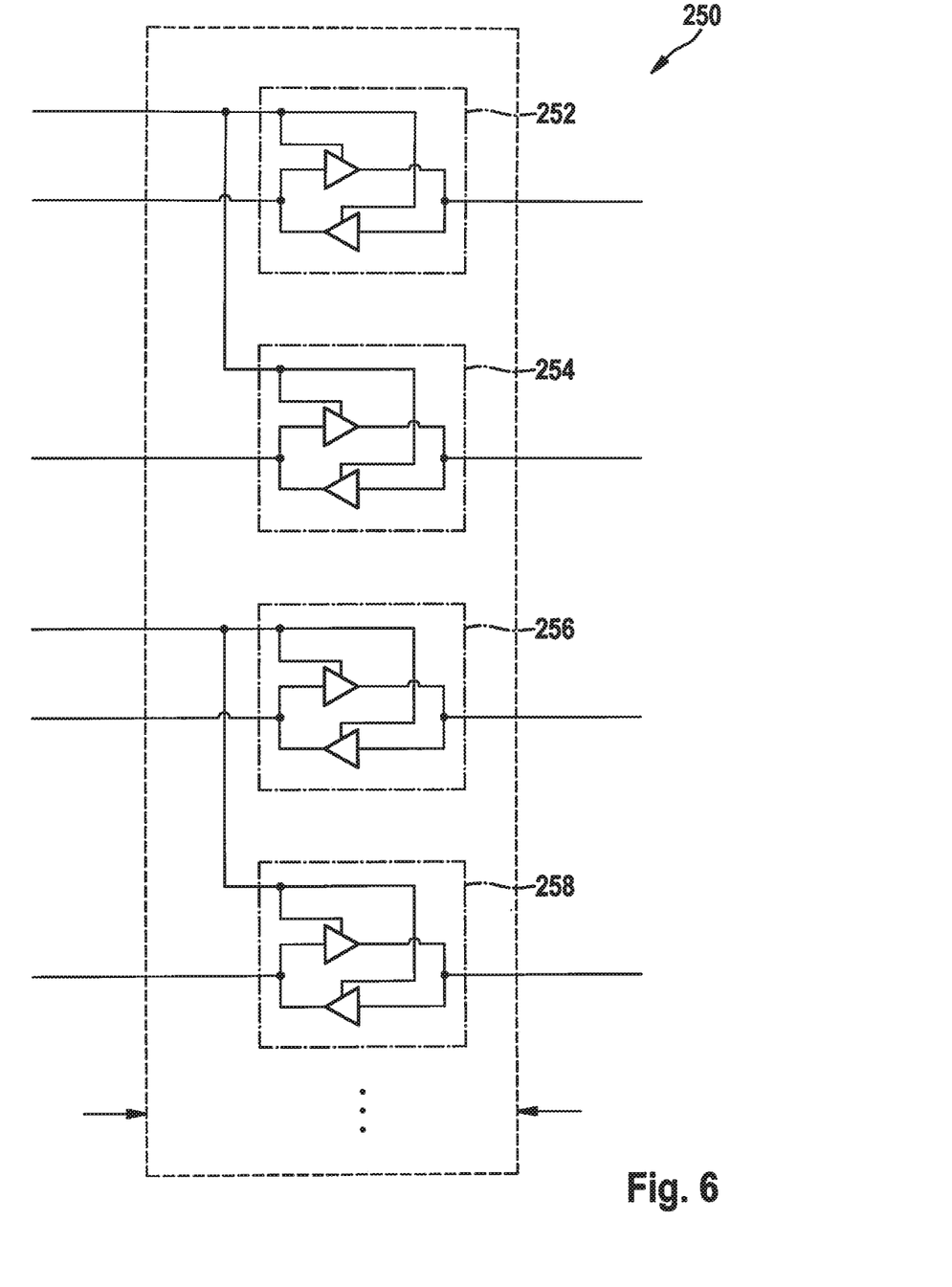
FIG. 6 is a block diagram showing a data link control serial peripheral interface (DLC-SPI) buffer.

FIG. 6 shows a DLC communication buffer module that is labeled in its entirety with the reference character 250. This module 250 represents only an interface for connecting the communication bus of the ASIC to external components. The Figure shows a first transceiver 252, a second transceiver 254, a third transceiver 256, and a fourth transceiver 258. Transceivers 252 to 258 are of identical construction. These are simply level converters having externally adjustable switching levels. Further transceivers can also be contained in module 250 depending on the embodiment of the communication bus.

The reset processor and monitoring system will be discussed below:

The VCI ASIC furthermore possesses an internal reset processor or internal reset handler, which monitors external supply voltages of the overall VCI. If various supply voltages exceed or fall below limit values, RESET signals are activated which keep the system in a safe state. The VCI ASIC also possesses a monitoring module that can monitor the computation core or an FPGA. In the context of monitoring, the monitor module serves as a kind of master, for example a computation unit or an FPGA, that controls the VCI. This is accomplished, for example, by way of a query-response interaction. A connection also exists to the reset module in order to trigger a reset as applicable. The functionality of the monitoring module is as follows:
monitoring can be activated via a command;
monitoring operates independently of pC functionalities or FPGA functionalities in the VCI;
cyclic monitoring via the communication module must be ensured;
cyclic redundancy check (CRC) calculation in the VCI ASIC ensures secure communication;
watchdog VCI ASIC pin signals CRC errors in SPI communication or a cyclic monitoring error;
monitoring module generates query/response interaction that must be replied to "correctly" by the pC or FPGA in a defined time window, for example via SPI or a parallel interface.

In interaction with voltage monitoring by way of the reset handling module, the VCI ASIC ensures that the overall VCI is always in a secure state. This creates the foundation for allowing the VCI also to be operated during driving operation of a vehicle.

In principle, the important interface controllers, for example CAN, K-Line, etc., are supported by the microcontroller. The interface controllers can also be implemented in the FPGA.

FIG. 7 shows possible configurations of the vehicle communication interface. A first embodiment 300 encompasses an FPGA 302 and an ASIC 304. A processor 306 and one or more interface controllers 308 are provided in FPGA 302. Interface controller or controllers 308 can support multiple interfaces, for example CAN.

A second embodiment 320 encompasses a computation unit 322 having one or more interface controllers 324 and an ASIC 326. A third embodiment 340 encompasses a computation unit 342, an FPGA 344 having one or more interface controllers 346, and an ASIC 348.

What is claimed is:

1. An electronic unit for a vehicle communication interface which is for bidirectional communication, comprising:
    an integrated module, including:
        a transceiver array;
        a communication interface; and
        a switch matrix having at least one switch that is connected to a first pin and to a second pin, in a first communication direction the first pin transmitting and the second pin receiving, and in a second communication direction the first pin receiving and the second pin transmitting, the at least one switch being configured to interrupt both communication directions simultaneously; and
        an analog-to-digital converter (ADC) and an ADC multiplexer;
    wherein the ADC has high input resistance values and very low leakage currents in the nA range to allow open load diagnosis when switches in the switch matrix are open or closed.

2. The electronic unit as recited in claim 1, wherein at least one of the at least one switch includes a low-leakage-current switch.

3. The electronic unit as recited in claim 1, wherein the electronic unit includes an ASIC.

4. The electronic unit as recited in claim 1, wherein at least one of the at least one switch of the switch matrix includes a back-to-back switch structure.

5. The electronic unit as recited in claim 1, further comprising:
    a transceiver array that serves as a level converter.

6. The electronic unit as recited in claim 1, further comprising:
    an additional computation unit which serves as a master in the electronic unit.

7. The electronic unit as recited in claim 1, further comprising:
    a further communication interface for configuring the electronic unit.

8. The electronic unit as recited in claim 1, further comprising:
    a module having an ADC, the ADC interacting with a multiplexer to allow different vehicle buses to be addressed.

9. The electronic unit as recited in claim 1, further comprising:
    a module having an ADC multiplexer to adapt the electronic unit to different vehicle buses.

10. The electronic unit as recited in claim 1, further comprising:
    a monitoring module configured to control a master.

11. The electronic unit as recited in claim 1, further comprising:
    a voltage monitor to monitor external voltages.

12. A vehicle communication interface for connection to a vehicle diagnostic interface by which a vehicle diagnosis is performable, comprising:
    an electronic unit which is for bidirectional communication, the electronic unit including a transceiver array, a communication interface; and a switch matrix having at least one switch that is connected to a first pin and to a second pin, in a first communication direction the first pin transmitting and the second pin receiving, and in a second communication direction the first pin receiving and the second pin transmitting, the at least one switch being configured to interrupt both communication directions simultaneously; and
    an analog-to-digital converter (ADC) and an ADC multiplexer, wherein the electronic unit is embodied as an integrated module;
    wherein the ADC has high input resistance values and very low leakage currents in the nA range to allow open load diagnosis when switches in the switch matrix are open or closed.

13. The vehicle communication interface as recited in claim 12, wherein at least one of the at least one switch includes a low-leakage-current switch.

14. The vehicle communication interface as recited in claim 12, wherein the electronic unit includes an ASIC.

15. The vehicle communication interface as recited in claim 12, wherein at least one of the at least one switch of the switch matrix includes a back-to-back switch structure.

16. The vehicle communication interface as recited in claim 12, further comprising:
    a transceiver array that serves as a level converter.

17. The vehicle communication interface as recited in claim 12, further comprising:
    an additional computation unit which serves as a master in the electronic unit.

18. The vehicle communication interface as recited in claim 12, further comprising:
    a further communication interface for configuring the electronic unit.

19. The vehicle communication interface as recited in claim 12, further comprising:
    a module having an ADC, the ADC interacting with a multiplexer to allow different vehicle buses to be addressed.

20. The vehicle communication interface as recited in claim 12, further comprising:
    a module having an ADC multiplexer to adapt the electronic unit to different vehicle buses.

21. The vehicle communication interface as recited in claim 12, further comprising:
    a monitoring module configured to control a master.

22. The vehicle communication interface as recited in claim 12, further comprising:
    a voltage monitor to monitor external voltages.

* * * * *